(12) United States Patent
Liney

(10) Patent No.: US 9,615,564 B2
(45) Date of Patent: Apr. 11, 2017

(54) ROD HOLDER

(76) Inventor: Michael John William Liney, West Sussex (GB)

( * ) Notice: Subject to any disclaimer, the term of this patent is extended or adjusted under 35 U.S.C. 154(b) by 211 days.

(21) Appl. No.: 14/118,702

(22) PCT Filed: May 16, 2012

(86) PCT No.: PCT/GB2012/051093
§ 371 (c)(1),
(2), (4) Date: Feb. 17, 2014

(87) PCT Pub. No.: WO2012/160351
PCT Pub. Date: Nov. 29, 2012

(65) Prior Publication Data
US 2015/0000177 A1    Jan. 1, 2015

Related U.S. Application Data

(60) Provisional application No. 61/488,372, filed on May 20, 2011.

(51) Int. Cl.
*A01K 97/10*    (2006.01)

(52) U.S. Cl.
CPC .................................... *A01K 97/10* (2013.01)

(58) Field of Classification Search
CPC ....................................................... A01K 97/10
USPC ........................................................ 43/21.2
See application file for complete search history.

(56) References Cited

U.S. PATENT DOCUMENTS

| | | | | |
|---|---|---|---|---|
| 538,534 A * | 4/1895 | O'Neill | ................ | A47B 23/046 108/8 |
| 684,451 A * | 10/1901 | Mowry | ................... | F16C 11/06 116/173 |
| 2,638,299 A * | 5/1953 | Abbott | ................... | F16M 11/14 248/181.1 |
| 2,950,836 A * | 8/1960 | Murdock | ........... | A24F 19/0092 131/241 |
| 3,783,547 A * | 1/1974 | Bystrom | ................ | A01K 97/10 248/516 |
| 3,792,829 A * | 2/1974 | Fickett | ................... | A01K 97/10 248/229.15 |
| 4,066,231 A * | 1/1978 | Bahner | ................... | B43M 99/00 248/289.11 |
| 4,081,115 A * | 3/1978 | White | .................... | A01K 97/10 224/200 |
| 5,280,871 A * | 1/1994 | Chuang | .................. | A45B 17/00 248/181.1 |
| 5,438,789 A * | 8/1995 | Emory | .................... | B63B 17/00 248/514 |
| 7,246,781 B2 * | 7/2007 | Nam | ...................... | A61H 19/44 248/516 |
| 7,296,377 B2 * | 11/2007 | Wilcox | .................. | A01K 97/10 114/255 |

(Continued)

FOREIGN PATENT DOCUMENTS

WO    WO2012/163051    11/2012

OTHER PUBLICATIONS

Interntational Preliminary Repot on Patentability PCT/GB2012/051093, Nov. 20, 2013.

*Primary Examiner* — David Parsley
(74) *Attorney, Agent, or Firm* — J. Bennett Mullinax, LLC

(57) ABSTRACT

The present invention is concerned with an improved rod holder, particularly a gunwale rod holder, particularly for use in sports fishing.

18 Claims, 11 Drawing Sheets

(56) References Cited

U.S. PATENT DOCUMENTS

| | | | |
|---|---|---|---|
| 7,387,284 B2* | 6/2008 | Chang | F16C 11/106 |
| | | | 108/7 |
| 7,774,973 B2* | 8/2010 | Carnevali | A01K 97/10 |
| | | | 248/276.1 |
| 2008/0155881 A1* | 7/2008 | Carnevali | A01K 97/10 |
| | | | 43/21.2 |

\* cited by examiner

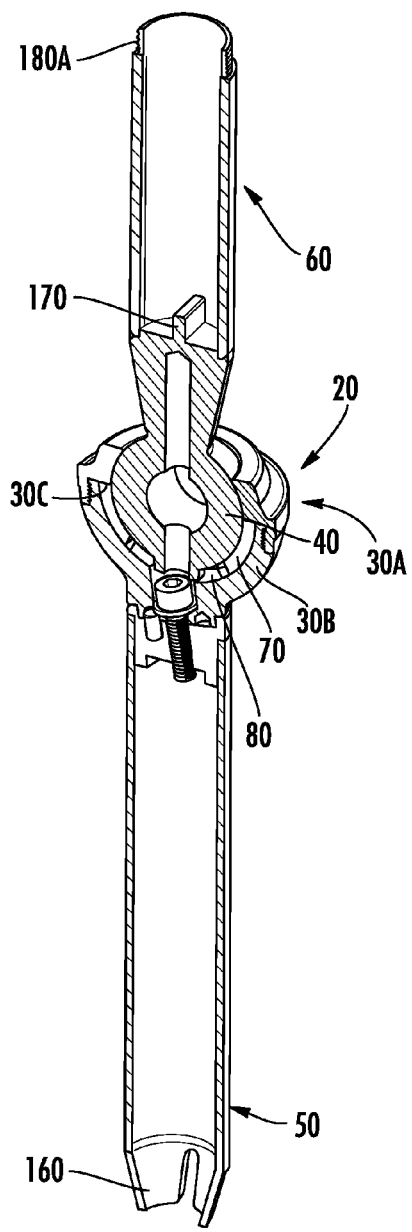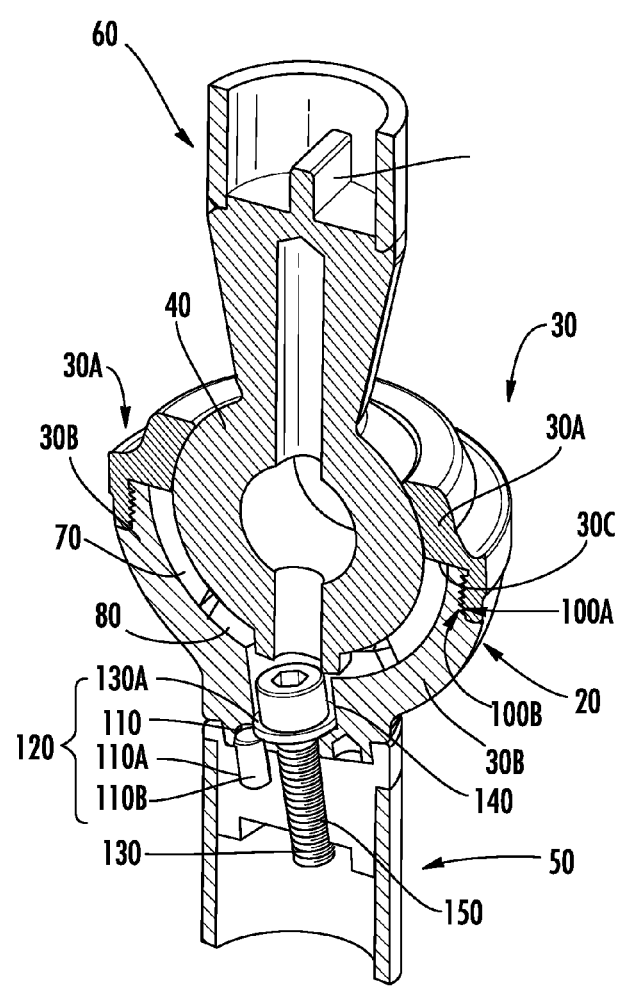
FIG. 3A
FIG. 3B

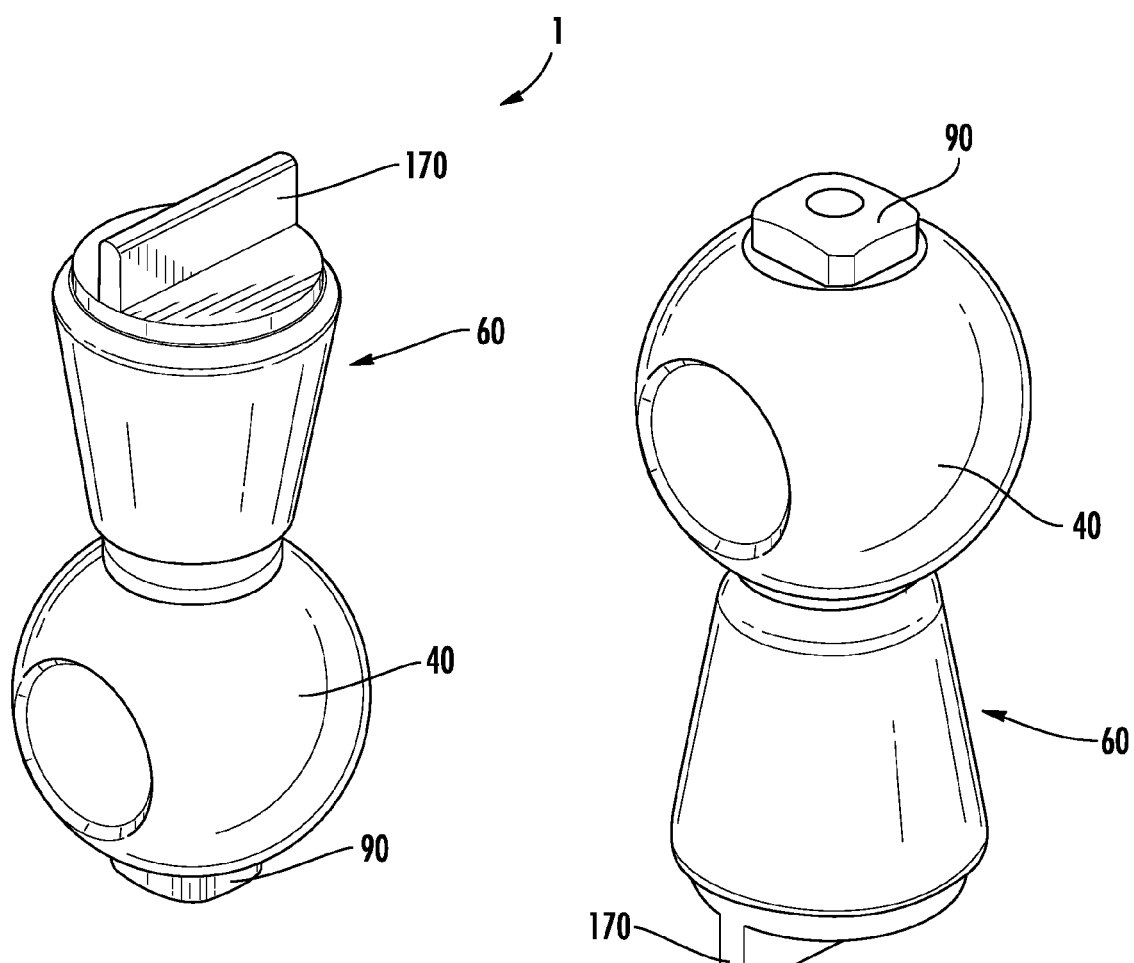

ROD HOLDER

The present invention is concerned with an improved rod holder, particularly a gunwale rod holder, particularly for use in sports fishing.

When sports fishing (i.e. "big game fishing"), there are a number of styles of reeling fish to a boat—one is the use of a so-called "fighting chair" in which the butt of the fishing rod sits in a rocking gimbal which allows the rod to be pulled back and forth and thus reel the fish in. The fishing rod or reel can be additionally connected to a harness or sling worn by the user (for example, a harness worn like a waistcoat or a sling that fits around the lower back or bottom of the user), allowing the user to exert force to pull the rod back without having to use their arms (although they will typically use their arms as well). Some fighting chairs are additionally provided with a foot rest which allows the user to develop force through their legs to be exerted upon the rod and pull it back. Examples include the likes of U.S. Pat. No. 6,431,109.

A second style is that of a stand-up harness or "fighting belt". In the simplest arrangements, suitable for smaller fish, the user simply wears a belt which includes a cup into which the fishing rod butt is placed, and they then user their arms to pull the rod back and reel the fish in. For larger fish, a harness is worn which includes a plate across the upper legs and has a socket for the fishing rod butt as well as straps to go around the waist and under the bottom of the user. Examples include the likes of U.S. Pat. No. 4,828,152 and U.S. Pat. No. 6,591,542.

Problems with and limitations of the fighting chairs include their size and cost, and the fact that it is only possible to hook up with one fish at a time—the orientation of the fish relative to the boat will change, meaning that the whole of the aft (rear) or the boat and the gunnels/gunwales must be kept clear to allow the fishing line to move across them and avoid line tangle. Therefore, it is not possible to hook up with two or more fish at a time.

The stand-up harnesses can be cumbersome and help is typically required to put them on, particularly if the user is already fighting a fish (a common occurrence).

There is also a hybrid between the two, namely a "stand-up fighting post"—this is smaller than the fighting chair, and is mounted in the midst of the aft deck of the boat (in the same way that a fighting chair can be). This can be provided with a padded arm against which the stomach of a user can rest, or with a belt or harness. Examples include the likes of U.S. Pat. No. 7,146,763.

Striking fishing rod holders (e.g. U.S. Pat. No. 5,163,244) are also known which allow for a hook-setting movement of the rod upon a fish strike of the bait trolled from the rod. In this case, a rod holder is hinged to allow for a backwards and forwards movement of the rod between a 'hit' position and a 'troll' position, and allowing for a fish to be firmly hooked. However, such striking fishing rod holders cannot be used with conventional rod holders and instead require special installation and fitting. In addition, they do not allow for any rotation of the rod about a generally vertical axis, i.e. the rod cannot be rotated to face the fish and instead the boat must be turned to keep the rod in line with the fish. This also means that it is generally not possible to simultaneously use multiple striking rod holders on a boat since movement of the fish relative to the boat may cause lines to cross and tangle. Alternatively, use of the striking rod holder must be limited to striking only, and not to reeling the fish in.

An alternative is the use of gunwale rod holders—sports fishing boats will typically have multiple gunwale rod holders, into which can be inserted products such as the "Viper Bob Stand Up Fighting Gimbal" (www.viperbob.net) which comprises a body which fits into and protrudes from the gunwale rod holder and to the side of which is attached a rocking (i.e. a single-axis) gimbal into which a fishing rod butt can be placed, allowing the rod to be pumped back and forth. This can be supplemented with a swivel which is inserted into the gunwale rod holder and which allows the body to rotate. However, the rod holders in most sports fishing boats are at an angle of at least 30 degrees from the vertical, which means that upon rotation of the body of the product, the gimbal which is attached to its side (and therefore the fishing rod) will have limited movement since it will strike the gunwales as the body rotates. Furthermore, if the user lets go of the rod while reeling a fish in then unless they wear a harness the rod may be pulled from the gimbal.

The present invention seeks to overcome the prior art disadvantages and provide an improved rod holder, particularly an improved gunwale rod holder.

According to the present invention there is provided a rod holder comprising:
 a two-axis gimbal comprising:
  a static base portion; and
  a driven upper portion;
 a shaft extending from said static base portion; and
 a shank extending from said driven upper portion and adapted to receive a fishing rod butt,
 said driven upper portion moveable relative to said static base portion.

Preferably, said driven upper portion is moveable about said static base portion.

A wide range of suitable two-axis gimbals will be readily apparent to the person of ordinary skill in the art, as are widely used to e.g. effect discrete pan and tilt movements of cameras.

Thus, in use with the butt of a fishing rod inserted in the shank, the general arrangement of the reel of the fishing rod, the fishing rod itself, and the rod holder remains the same throughout rotation of the fishing rod and forwards and backwards motions used when attempting to reel a fish in whilst fighting it. Thus, with the reel above the fishing rod, it remains above the fishing rod (i.e. with the fishing rod between it and the rod holder) during any movement of the shaft relative to the shank, i.e. of the driven upper portion relative to the static base portion.

Preferably, the driven upper portion is able to freely "pan", and the "tilt" (i.e. rolling) movement is constrained to prevent it "tilting" (i.e. rolling) too far. Preferably, the driven upper portion is adapted to substantially prevent the driven upper portion from "tilting" (i.e. rolling).

Preferably, the two-axis gimbal is provided in the form of a ball joint arrangement. In such an embodiment, the static base portion comprises a ball joint socket member (with the shaft extending therefrom), and the driven portion comprises a ball member (with the shank extending therefrom and adapted to receive a fishing rod butt). In such an embodiment and to limit the movement of the driven portion, additional features are provided, namely:
 a ball joint liner located between said ball joint socket member and said ball member,
 said ball joint liner defining a slot, said ball member having a finger extending therefrom and mated with said slot, said finger shaped such that said finger is able to slide along the length of said slot but is not able to rotate within said slot; and
 said ball joint socket member defining a shoulder portion which constrains movement of said ball joint liner.

Thus, such an embodiment comprises a rod holder comprising a ball joint arrangement comprising:
- a ball joint socket member (i.e. a static base portion);
- a ball member (i.e. a driven upper portion);
- a shaft extending from said ball joint socket member;
- a shank extending from said ball member and adapted to receive a fishing rod butt; and
- a ball joint liner located between said ball joint socket member and said ball member, said ball joint liner defining a slot, said ball member having a finger extending therefrom and mated with said slot, said finger shaped such that said finger is able to slide along the length of said slot but is not able to rotate within said slot;

said ball joint socket member defining a shoulder portion which constrains movement of said ball joint liner.

Thus, the ball joint liner rotates about (i.e. within) the ball joint socket member, constrained by the shoulder portion. Preferably, the ball joint liner is rotatable about a single axis. Preferably, the ball joint liner is freely rotatable about a single axis.

Thus, a two-axis gimbal is provided and the driven upper portion moves about (i.e. relative to) the static base portion.

As will be appreciated, 'sliding' is not used restrictively to describe relative movement in only one plane, but rather refers to any relative movement between two proximal components.

Naturally, the finger being able to slide along the length of the slot refers not only to a situation where the finger can travel the entire length of the defined slot, but also any nominal movement of the finger along the length defined by the slot.

The dimensions of the slot in the ball joint liner can act to constrain the degree to which the ball member and shank can be tilted. The shaping and dimensions of the outer surface of the ball joint socket and the shank can additionally act to constrain the degree to which the shank can be tilted.

This is a particularly preferred embodiment of the present invention since (as detailed in the specific embodiments below) it allows for a simple, compact construction which has an excellent ability to withstand load and shocks as compared to conventional two-axis gimbals since relatively large load bearing surfaces are provided (in the form of the surfaces of the ball joint socket member, ball joint liner and ball member) as opposed to relatively small conventional pivots (or having to provide cumbersome large pivots which are sufficiently tolerant to load and shocks). This embodiment is further advantageous in that the construction means that there are no exposed parts in which things such as fingers or items of clothing might become trapped.

As will be appreciated, there are many ways in which such a rod holder, particularly the ball joint arrangement, may be fabricated, and they will be readily apparent to one of ordinary skill in the art.

For example, the shoulder portion may comprise a continuous rim or lip within the ball joint socket to constrain the movement of the ball joint liner, and the upper surface of the ball joint liner which abuts it may be continuous or discontinuous. Alternatively, the shoulder portion may be discontinuous and the upper surface of the ball joint liner which abuts it may be continuous.

If it is desired to provide a slight additional degree of freedom of movement of the ball member (e.g. to allow for a sideways "tilt" movement, i.e. a rolling movement, in addition to the rotation ("pan") (yawing) and the forwards and backwards "tilt" (pitching)) then it is possible to modify the ball joint liner so that it does not continuously abut (or is not continuously abutted by) the shoulder portion and has a limited movement about additional axes, e.g. defines a hollow segment of a sphere less than a hemisphere, e.g. defines the spherical part of a spherical cone.

Preferably, the ball joint socket member comprises multiple (e.g. first and second) parts in order to allow for easy assembly. For example, it may comprise first and second parts which define sections on either side of a vertically oriented plane through the ball joint socket member. Such sections can conventionally be held together with e.g. bolts or other compression means.

Alternatively, the ball joint socket member may comprise upper and lower sections, more particularly a lower hemisphere in which the ball joint liner sits, and an upper section which defines the shoulder portion. The upper and lower sections may have complementary threaded sections so that they can be screwed together. Compression means or restraining means may be used to prevent the upper and lower portions from becoming separated e.g. unscrewed. For example, one of the upper and lower portions may be provided with at least one retaining member such as a sprung retaining clip, the other of the upper and lower portions defining a surface feature with which the retaining member mates or engages.

The slot may comprise a recess in the ball joint liner, or may extend through the ball joint liner to define a hole in it.

Preferably, the shank comprises a hollow "flute" section, preferably the shank terminates in a hollow flute section. Preferably, the ball member and/or shank are adapted to mate with a fishing rod butt gimbal. Preferably the hollow flute section is adapted to mate with a fishing rod butt gimbal. More preferably, the shank hollow ("flute") section has defined within it a blade or X-shaped section within it protruding from the base of the shank hollow ("flute") section for mating with a fishing rod butt gimbal.

Preferably the shank hollow ("flute") section is elongate. In particular, this means that when a fishing rod butt is placed within it, the butt abutting the base of the hollow "flute" section, the pulling of the rod from it by a fish will be resisted since this will cause the shank to tilt as far as is permitted by the ball joint arrangement. Further tilting is prevented by the ball joint arrangement, and so pressure is exerted on the lip of the shank hollow "flute" section by the rod, and upon the interior of the shank hollow "flute" section by the rod butt, friction between the lip of the shank hollow section and the rod and between the rod butt and the interior of the shank hollow section providing resistance against the rod from being pulled from the shank hollow section, hence providing a friction fit.

The shank hollow section may be adapted such that it can be used with different length fishing rod butts. In certain embodiments, the shank hollow section comprises an extension to allow it to be conveniently used with longer fishing rod butts. For example, the shank hollow section may have a threaded section onto which can be screwed and affixed a shank extension portion. By selecting a shank extension portion of an appropriate length, a shank hollow section having a desired total length can be provided. Thus, a short shank extension portion may be chosen for use with short fishing rod butts, and a long shank extension portion may be chosen for use with long fishing rod butts.

Fishing rods are available with straight butts and bent butts, bent butts typically being at an angle of e.g. 30-45 degrees to the main body of the rod. Preferably, the shank, particularly the shank extension portion, is adapted to accommodate both straight and bent butt fishing rods. In order to work with a bent butt rod, the maximum "forward"

(i.e. pitching) position that can be achieved by the ball member must be more vertical (to an appropriate extent) than for a straight butt rod. The rod holder may be suitably adapted to accommodate use of straight butt and bent butt fishing rods. For example, the finger and slot arrangement (or any other feature such as an upper slot defined in at least one of the ball joint socket member and the ball joint liner) which constrains forward and back i.e pitching movement of the ball member and thus the shank can be suitably shaped and dimensioned. Thus, with the ball joint liner (and ball member) rotated to a first angle relative to the ball joint socket member, a first range of forward and backward pitching angles may be achievable and suitable for use with a bent butt rod. Upon rotation of the ball joint liner (and ball member) 180 degrees about the ball joint socket member, a different range of angles of forward and back pitching angles may be achievable and suitable for use with a straight butt fishing rod.

Preferably, the shaft terminates in a mating portion adapted to mate with a blade or X-shaped section, particularly with such a section which protrudes from the base of a rod holder defined in a boat, more particularly in the gunwales of a boat. Preferably, the shaft is dimensioned to provide a snug fit with the rod holder, and thus to minimise movement of the shaft in the rod holder.

As detailed above, a typical angle for a gunwale rod holder formed in a boat is about 30 degrees from the vertical. However, some gunwale rod holders may be formed at a different angle from the vertical, for example 45 degrees. Thus, the angle of the shaft to the base portion may be set accordingly. In certain embodiments, the angle is fixed. In other embodiments, the angle is adjustable.

In order to provide an adjustable angle, the shaft and static base portion may be fabricated such that they include an angled component which can be varied according to the angle which is to be achieved. For example, the static base portion may itself define an angle to the shaft. The shaft may be interchangeable such that a first shaft which defines a first angle to the static base portion can be changed for a second shaft which defines a second angle to the static base portion.

Thus, as above, first and second shafts may be provided to achieve generally or substantially the same angle of the static base portion to the vertical with gunwale rod holders at different angles from the vertical. For example, a first shaft may be for use with a gunwale rod holder which is at 30 degrees from the vertical, and a second shaft may be for use with a gunwale tod holder which is at 45 degrees from the vertical.

The interior concave surface of the static base portion may define a hole, preferably a recessed hole, at its bottom into which a bolt or other securing member can be inserted and through which it can pass to project from the bottom of the static base portion. The shaft may be complimentarily shaped and dimensioned such that it can receive the securing member to secure the static base portion and the shaft together. For example, the securing member may comprise a shoulder screw. The shaft may define a recess for receiving the shoulder screw, with a threaded portion complimentary to the threaded portion of the shoulder screw such that the shoulder screw acts to hold the static base portion and the shaft together. In order to allow for convenient and easy disassembly, a spring may be provided in the recess in the static base portion, on top of which is placed the securing member (e.g. the shoulder screw). Thus, the shoulder screw is placed in the recess in the static base portion on top of the spring and force is exerted to compress the spring and the shoulder screw is screwed into the complimentary thread of the shaft. The shoulder screw can then easily be retrieved from the static base portion recess and the components separated by simply unscrewing the shoulder screw, at which point the spring will expand and urge the shoulder screw from the recess.

In order to ensure that the static base portion and the shaft are correctly oriented relative to one another, features can be defined in them which require their correct orientation when they are assembled. For example, the static base portion and shaft may each define a further recess, into which a dowel pin is inserted to form a dowel joint. This ensures the correct orientation/alignment of the static base portion and the shaft relative to one another.

Alternatively, to provide for an adjustable angle of the static base portion to the shaft, the shaft may comprise first and second wedge portions facing (i.e. opposed against) one another and rotatable relative to one another (with e.g. a conventional sprung member holding them together). With the angle of the wedges from the horizontal being e.g. 22.5 degrees, the wedges can be rotated relative to one another to define an overall angle for the shaft to the base portion of between 0 degrees and 45 degrees. Other angles from the horizontal for the wedges can readily allow for different ranges of angles to be achieved. In order to allow for the movement of the wedge portions relative to one another to be controlled (and undesired movement avoided), the wedge portions may be provided with surface features to restrict movement. Thus, surface features may be provided to ensure that movement is indexed. For example, the wedge portions may be provided with a protruding finger or fingers and complimentary recesses. A retaining member (such as a shoulder screw) may be used to hold the wedges in place once they are at a desired orientation relative to one another.

Preferably, the ball joint socket member defines an upper rim which in addition to or together with the slot in the ball joint liner constrains the movement of the shank, thus defining a maximum extent to which the shank may be tilted forwards or backwards. To assist in "striking" and allow for a more extended striking movement, the ball joint socket member preferably defines at least one feature which allows the shank to be moved further backwards when in certain positions rotated relative to the ball joint socket member than in other positions rotated relative to the ball joint. For example, such an upper rim may have a recess or lip defined in it, allowing such a movement.

Preferably, the ball member is fabricated from a single piece of material, more preferably from a single piece of stainless steel. Preferably, the ball joint liner is fabricated from brass. Other suitable materials will be readily apparent to one of ordinary skill in the art. For example, it may be desirable to fabricate the shank and the shaft from aluminium.

Unless stated otherwise (or unless they conflict with the relevant features), the above preferred features are applicable mutatis mutandis to all the following further aspects of the present invention, and vice versa.

According to a further aspect of the invention, the rod holder comprises a ball joint arrangement comprising:
    a ball joint socket member (i.e. a static base portion);
    a ball member (i.e. a driven upper portion);
    a shaft extending from the ball joint socket member;
    a shank extending from the ball member and adapted to receive a fishing rod butt; and
    a ball joint liner located between the ball joint socket member and the ball member,
the ball member defining a slot, the ball joint liner having a finger extending therefrom and mated with the slot, the finger shaped such that it is able to slide along the length of the slot but is not able to rotate within the slot;

the ball joint socket member defining a shoulder portion which constrains movement of the ball joint liner.

This embodiment provides for a reversed arrangement of the finger and slot, and provides similar advantages to the earlier embodiment. In all embodiments of the present invention, the finger and slot arrangement defines the pitching motion that can be achieved by the ball member.

The finger and slot arrangement is not limited to the above arrangements however, and in further embodiments, the rod holder comprises a ball joint arrangement comprising:
 a ball joint socket member;
 a ball member;
 a shaft extending from the ball joint socket member;
 a shank extending from the ball member and adapted to receive a fishing rod butt; and
 a ball joint liner located between the ball joint socket member and the ball member,
a first component comprising one of the ball joint liner and the ball member defining a slot, a second component comprising the other of the ball joint liner and the ball member having a finger extending therefrom or therethrough and mated with the slot, the finger shaped such that it is able to slide along the length of the slot;
the ball joint socket member comprising a retaining portion which retains the ball joint liner and/or the ball member in the ball joint socket member.

Naturally, the finger and slot can be arranged in a number of configurations to constrain both the extent and the axes of movement of the shank. For example, the finger may originate at the second component. Alternatively, the finger may extend from the ball joint socket member (i.e. originate from neither of the first and second components), through an orifice defined in the ball joint liner (in this case, the second component) and mating with a slot in the ball member (in this case, the first component).

In all embodiments, the rotation of the ball member relative to the ball joint liner must be controlled in order to provide the two-axis gimbal feature. In certain embodiments, the finger is shaped such that it is able to slide along the length of the slot but is not able to rotate within the slot, thus restricting relative rotation between the first and second components.

Thus, preferably the ball member is rotatable relative to the ball joint liner about a first axis. Thus, preferably the ball member and ball joint liner are adapted such that the ball member is rotatable relative to the ball joint liner about a first axis Preferably, the first axis is generally or substantially perpendicular to a plane which intersects the slot along its length.

Thus, a first degree of rotational freedom is provided between the ball member and the ball joint liner, whereby the ball member is able to rotate about a first axis backwards and forwards (i.e. pitching) relative to the ball joint liner, the movement being defined by the slot and finger arrangement.

A second degree of rotational freedom is provided between the ball joint liner (and therefore also the ball member) and the ball joint socket member, the ball joint liner being rotatable about a second axis within the ball joint socket member (i.e. yawing).

Thus, preferably the ball joint liner is rotatable relative to the ball joint socket member about a second axis. More preferably, the first and second axes are generally or substantially perpendicular to one another.

In other embodiments, the axes about which the ball joint liner and ball member are able to rotate are switched. Thus, the ball joint liner and ball member are arranged such that the ball member is able to rotate about a first axis in a yawing movement, and the ball joint liner is able to rotate about a second axis in a pitching movement. The other aspects of the present invention apply mutatis mutandis to such embodiments.

Preferably, the ball member is not free to rotate about the second axis, and the ball joint liner is not free to rotate about the first axis.

Naturally, in any product there may be a limited amount of a third degree of rotational freedom (i.e. rolling). This may be by design, or may be as a result of e.g. wear and tear.

Therefore, the rod holder is preferably adapted such that substantially the only rotational movement that the ball member can achieve (by rotation relative to the ball joint liner, and rotation of the ball joint liner relative to the ball joint socket member) is pitching and yawing, i.e. rotation about the first and second axes. Thus, the ball member is preferably substantially unable to achieve a rolling rotational movement (i.e. rotation about a third axis, the first, second and third axes being generally or substantially orthogonal).

Similarly, there may be a limited amount of translational movement. Therefore, the rod holder is preferably adapted to substantially inhibit translational movement of the ball member.

In certain embodiments, the finger is able to rotate within the slot (or as can be alternatively expressed, the finger is rotatable relative to the slot). Preferably, in such embodiments the finger and slot are adapted to allow limited rotation, or are constrained to lock at an at least one relative rotation. Preferably, the finger and slot arrangement is adapted to maintain the rod angle within a predefined optimal range at which a user is best able to control and reel in the fish. In certain embodiments, the ball joint socket member and ball joint liner arrangement is adapted to provide increased resistance to further rotation at an at least one angle. Such a feature aids the user in maintaining the rod at an optimal angle for performing certain tasks.

Where the finger does not constrain relative rotation of it and the slot (i.e. does not prevent a yawing rotational movement between the two), the relative rotational yawing movement of the ball joint liner and ball joint member must be constrained in another way.

Therefore, in preferred embodiments the ball joint liner and ball member are adapted to prevent or inhibit rotational yawing of the ball member relative to the ball joint liner. Since a first degree of rotational freedom (in the form of a pitching rotational movement of the ball member relative to the ball joint liner, i.e. rotation about a first axis) is a required feature, the ball joint liner and ball member are preferably adapted such that substantially the only relative rotational movement which they are able to undergo between them is a pitching movement, i.e. rotation about a first axis. Thus, they may be adapted such that they are substantially unable to effect a relative yawing movement (i.e. rotation about a second axis generally or substantially perpendicular to the first axis). More preferably, they may be adapted such that they are substantially unable to effect a relative yawing or rolling movement (i.e. rotation about the second axis or a third axis, the first second and third axes being generally or substantially orthogonal).

This may be achieved in a number of different ways. Preferably, the ball member is engaged with the ball joint liner such that it is able to achieve a pitching rotational movement relative to the ball joint liner, i.e. is rotatable about the first axis. Thus, in preferred embodiments arms extend from opposite sides of one of the ball member and the ball joint liner, and are engaged with (e.g. mounted on, or mated with) the other of the ball member and the ball joint liner.

Thus, preferably the ball member comprises a pair of arms extending therefrom, and the ball joint liner is adapted to engage with the arms. Thus, for example, the ball member may have arms protruding from either side and mated with complementary recesses in the ball joint liner, the ball member being rotatable relative to the ball joint liner about the axis defined by the arms.

In other embodiments, arms extend inwardly from opposite sides of the ball joint liner and are received by (are mated with) complementary features in the ball member.

In further embodiments, the arms extend from the ball member and are provided by way of a separate cross member which passes through the ball member.

Preferably, the axis of rotation of the ball member (i.e. the axis of rotation of the ball member relative to the ball joint liner, i.e. the first axis) passes through the centre of the ball member.

Naturally, depending upon the shape of the arms and the member or members with which they are engaged, the movement effected as the ball member rotates may not be purely rotational, and may include a limited amount of translational movement.

As detailed below, in certain embodiments the arms are provided in the form of a cross member which acts to constrain relative movement of the ball member and ball joint liner.

Thus, in a further aspect of the present invention, the ball joint liner defines a ball joint liner cavity (i.e. the volume interior of the ball joint liner) within which the ball member is located, a ball member passage being defined within and traversing the ball member, the rod holder additionally comprising a cross member traversing the ball joint liner cavity via the ball member passage from a first part of the ball joint liner to a second part of the ball joint liner, the ball member being rotatable about an axis defined by the cross member.

In certain embodiments, the ball member is rotatable about the cross member. In other embodiments, the cross member (together with the ball member) is rotatable about the (longitudinal) axis defined by the cross member.

Naturally, the ball member does not have to be wholly contained within the volume defined by the ball joint liner— the ball member may extend beyond (e.g. protrude from) the ball joint liner. For example, a ball joint liner having a generally spherical shape with a segment of the sphere removed may have the ball member protruding where the segment of the sphere has been removed.

Preferably, the cross member passes through the centre of the ball member.

Preferably, the ball member passage is of substantially circular cross section.

Preferably, the cross member is of substantially circular cross section. Other cross-sections may of course be used. For example, with the ball member passage being of circular cross section, the cross member may have a cross section which is a regular polygon.

Other suitable combinations of cross section of the cross member and ball member passage will be readily apparent to one of ordinary skill in the art.

Preferably, the cross member is separable from the ball joint liner. For example, as detailed herein, the ball joint liner may comprise a plurality of parts which can be assembled together to define the ball joint liner (and a ball joint liner cavity), and which can mate with or otherwise receive or engage with the cross member. With the cross member separable from the ball joint liner, the cross member can first be inserted into the ball member passage such that it protrudes from both ends of the passage, and the ball joint liner can then be assembled around the ball member and cross member arrangement, such that the ends of the cross member are mated with the ball joint liner. In this arrangement, the ball member is located within the ball joint liner cavity, and the cross member traverses the ball joint liner cavity via the ball joint member passage from a first part of the ball joint liner (with which a first end of the cross member is mated or otherwise received or engaged with) to a second part of the ball joint liner (with which a second end of the cross member is mated or otherwise received or engaged with). The ball member is thus rotatable about the cross member, defining a first axis about which the ball member is rotatable, i.e. defining a first gimbal axis.

Preferably, the cross member defines first and second ends. Preferably, both ends of the cross member are engaged with, more preferably are mated with, the ball joint liner. Preferably, the ball joint liner is fabricated to house the cross member ends and distribute the dynamic loads of the cross member to reduce stress concentrations.

During use, the ball joint socket member, ball joint liner and ball member may be subject to large forces which are constantly changing direction and magnitude. Without the use of arms extending from opposite sides of one of the ball member and the ball joint liner, and engaged with the other of the ball member and the ball joint liner. (for example by way of a cross member engaged at both ends with the ball joint liner), such forces from the shank may be supported by the edges of the defined slot(s), leading to large stress concentrations and damage, in turn necessitating the use of excessively heavy-duty components.

Thus, such embodiments can provide a substantial advantage in the form of stress distribution and thus improved product life. In particular, the use of a cross member can allow for it to be conveniently and easily replaced in the event of it suffering damage, further enhancing the product life and usefulness.

The ball joint liner, particularly the parts which mate with, engage with or otherwise receive the arms e.g. the cross member, can be designed to withstand and distribute the in-use loads, thus reducing damage. Instead of high load concentrations on the finger (or a part thereof) and the slot, load distribution can be by way of supporting the load on larger surface areas e.g. the surface of the cross member and the ball joint liner.

In the case of the present invention, a large amount of force can be placed on the members bearing the load for each gimbal axis. By removing the load of "forwards and backward" movement from the finger (which load may result in high stress concentrations at particular points where the slot constrains the movement of the finger at the extremes of forwards and back movements), the risk of failure can be reduced.

As detailed below, the load upon the finger and slot arrangement where the slot prevents further forward or backwards movement of the finger can also be reduced/distributed by the provision of a slot constraining movement of the shank/ball and shank member (as defined below).

The provision of arms, for example a cross member, is in addition to or as an alternative to the shaping of the finger such that it is able to slide along the length of the slot but is not able to rotate within the slot.

Preferably, the finger is mated with the cross member or the ball member. In the case of the finger being mated with the cross member, this can be very useful in reducing load on the cross member, particularly on the central region of the cross member. For example, with the finger extending from the ball joint liner and the ball member defining the slot, the finger can be mated with the cross member, meaning that load exerted downwards upon the cross member can be transferred to the finger (which extends upwards to the cross member). This can further assist in enhancing the reliability of the product.

Thus, with the finger mated with the cross member, the cross member (and therefore the ball joint liner and the ball member) is rotatable about the finger, more specifically about a longitudinal axis defined by the finger (i.e. the second axis).

Thus, with finger mated with the cross member and the cross member mated at either end with the ball joint liner, the ball joint liner rotates within the ball joint socket member, and the ball member rotates within the ball joint liner.

Preferably the finger is separable and detachable from the ball member and/or the ball joint liner. More preferably, the finger is separable and detachable from the component part from which it extends. Preferably the finger is screwably separable from the ball member or ball joint liner, or the finger is slidably separable from the ball member or ball joint liner. Preferably, the finger is screwably separable from the component part from which it extends. Preferably, the finger is slidably separable from the component part from which it extends.

Naturally, such a design would provide all the benefits of having a finger but with the additional advantages of ease of disassembly and reassembly. The different methods of fixing a separable finger within such an assembly would be apparent to one skilled in the art.

Preferably, the slot acts to constrain relative movement of the finger. As such, the range of allowable movement of the ball member, and therefore the shank, is constrained.

The slot may be shaped to vary the resistance to movement of the finger along its length at certain points along the slot, i.e. at certain shank angles. Preferably, the slot is provided with at least one notch or narrow section, the at least one notch or narrow section dimensioned to provide a friction fit between it and the finger, thus providing sensory feedback for a user during use. For example, the slot may be provided with a section dimensioned to provide a friction fit between it and the finger when the ball member is at a position relative to the ball joint liner (and therefore the ball joint socket member) which corresponds to an "at rest" or a "neutral" position of a rod inserted in the rod holder.

Preferably, as well as extending between the first and second components, the finger extends to at least one of the ball joint socket member and the cross member. Preferably, the finger extends along the axis of rotation of the ball joint liner (i.e. the second axis).

Preferably, at least part of the finger is housed within a separable washer. Preferably the washer is located within at least one of the ball joint liner, the ball joint socket member and the ball member. The washer may be a low friction washer and thus ease relative movement of the finger and any of the above components.

Preferably, the finger extends between the first and second components and at least one of the ball joint socket member and the cross member.

Preferably in the various embodiments, the finger comprises a shoulder or other location aiding feature, the shoulder or other location aiding feature abutting with the washer and locating the finger within a recess in the ball joint arrangement, more preferably within a recess in at least one of the ball joint liner, the ball joint socket member and the ball member.

Preferably, the washer is wholly or partially located within at least one of the ball joint liner, the ball joint socket member, and the ball member.

As used herein, reference to a shoulder in the finger is reference to any change in radius of the finger designed to interact with the washer to fix the location of the washer and the gimbals arrangement relative to the finger.

Preferably, the ball member and shank combined define a ball and shank member. Preferably, the at least one of the ball joint liner and the ball joint socket member defines an upper slot through which the ball and shank member extend, the upper slot constraining movement of the ball and shank member.

Preferably, the part of the ball and shank member located within the upper slot is able to slide (i.e. is slidable) along the length of (i.e. is able to slide lengthways along) the upper slot.

As such, a secondary constraint can be put on the range of movement of the shank by shaping the upper slot and the ball and shank member to abut at the same shank angle that the slot and the finger abut. Such an upper slot can share and thus reduce the mechanical load applied to the slot during use, thus reducing the wear and chance of failure of the finger and/or slot, as well as providing more design freedom in terms of geometry and materials.

Preferably, the ball joint socket member comprises a base portion and the retaining portion. Preferably, the retaining portion is separable from the base portion.

This assists in convenient assembly, disassembly and maintenance of the ball joint socket arrangement—by having the retaining portion separable from a base portion of the ball joint socket member, the ball member and ball joint liner can be assembled and then placed in the ball joint socket member base portion, and the ball joint socket member retaining portion then attached to the base portion in order to retain the ball joint liner and ball member in the ball joint socket member. Similarly, it also allows for convenient maintenance—replacement parts or components with different characteristics such as a shorter or longer slot can be used depending on the situation, allowing a user to tailor the rod holder characteristics to the desired use. For example, some users may prefer to have a longer slot in order to allow for a greater degree of forward and backward movement. Naturally, any other components which also constrain forward and backward movement (such as an upper slot defined in the ball joint liner) would have to be appropriately dimensioned to allow for the required degree of movement and so may also have to be replaced.

Preferably, the retaining portion is screwably attached to the ball joint socket base portion.

In order to prevent unintentional or unwanted movement (for example unscrewing) of the retaining portion from the base portion, the base portion and retaining portion may comprise retaining means for example in the form of mating or locking means which when mated or locked together inhibit movement of the retaining portion relative to the base portion.

For example, this may take the form of retaining means such as a retaining clip or retaining arm, or locking means such as a locking member. For example, the base portion can be provided with a sprung retaining arm which urges against the surface of the retaining portion, which in turn is provided with at least one receiving member in the form of a feature (for example a recess or a protrusion) complementary to the portion of the retaining arm which urges against the retaining portion. As such, the retaining arm and retaining portion collaborate (in this case, mate with one another) to prevent unwanted or undesired screwing or unscrewing of the retaining portion from or to the base portion. Thus, complementary male and female members can be provided.

Preferably, there is a plurality of at least one of the male and female members. More preferably, there is a plurality of female members. Thus, in some embodiments the retaining portion is provided with a plurality of features complementary to the portion of the retaining arm which urges against the retaining portion.

In other embodiments, the base portion is provided with a slidable member which mates with or otherwise collaborates with a recess or other receiving member in the retaining portion such that when slid into position, movement (particularly a screwing or unscrewing movement) is prevented.

Other suitable arrangements will be readily apparent to the person of ordinary skill in the art.

In certain embodiments, the retaining portion constrains movement (i.e. constrains translational movement) of both the ball joint liner and the ball member. In other embodiments, the retaining portion constrains movement (i.e. constrains translational movement) of just the ball joint liner. In other embodiments, the retaining portion constrains movement (i.e. constrains translational movement) of just the ball member. For example, in some embodiments relative translational movement of the ball member and ball joint liner is prevented, constrained or inhibited e.g. by the ball joint liner extending beyond just a lower hemispherical portion of the ball member, or it may be due to other features such as a cross member (as detailed further herein) constraining translational movement of the ball member. In such embodiments, the retaining portion constraining/retaining just one of the ball joint liner and the ball member can effect to constrain translational movement of/retain the other.

Preferably, the retaining portion inhibits translational movements of the ball joint liner.

Preferably, the retaining portion abuts the ball joint liner.

Naturally, the retaining portion may retain (and thus restrain) the ball joint liner in a multitude of ways. For example, the retaining portion may define a flange which abuts the ball joint liner. Alternatively, the retaining portion may define a curved shell, as if defining a part of a sphere. In another embodiment, the retaining portion may define a plurality of radially inwards extending extrusions which restrain movement of the ball joint liner.

Preferably, the ball joint liner (or a part thereof, such as a lip, more preferably a circumferential lip) is constrained between the retaining portion and the base portion.

Thus, when the retaining portion is attached to the ball joint socket base portion it retains the ball joint liner, preventing it from being removed from the assembly and inhibiting, constraining or preventing any translational movements.

Other embodiments will be readily apparent to one of ordinary skill in the art which embodiments constrain translational movement of the ball joint liner, in particular which prevent or limit translation movement of the ball joint liner, whilst allowing it one degree of rotational freedom.

Preferably, the ball joint liner is fabricated in at least two separate sections. A multi-section fabrication is particularly advantageous, enabling the ball joint liner to be easily and conveniently assembled around the ball joint member. Similarly, disassembly for e.g. cleaning and servicing and replacement of any damaged or worn parts is also simplified. In certain embodiments, multiple (for example, two, three or four) instances of a single unit member can be assembled together to form the ball joint liner. Thus, the amount of tooling necessary to form the finished product can be reduced.

Preferably, the plane of separation of the ball joint liner sections is substantially vertical.

In a preferred embodiment, the ball joint liner is fabricated of two parts and the plane of separation of the two sections of the ball joint liner is substantially vertical. This allows the two sections to be identical parts, simplifying and reducing the cost of fabrication.

However, this need not necessarily be the case, a number of different contact surfaces which are not substantially vertical could be manufactured which would still enable the ball joint liner to be fabricated and assembled out of a plurality (for example, two, three or four, more preferably two) of identical pieces. Examples of suitable contact surfaces include those defining a series of steps, protrusions or angled surfaces. Preferably, the individual parts are complementary to one another and can be assembled to form the ball joint liner.

Also provided according to the present invention is a rod holder according to the present invention with the butt of a fishing rod inserted in the shank.

Also provided according to the present invention is an apparatus comprising a rod holder according to the present invention and a fishing rod.

Also provided according to the present invention is the use of a rod holder according to the present invention in a method of fishing, the method of fishing comprising inserting the butt of a fishing rod into the shank of a rod holder according to the present invention, and then fishing with the fishing rod.

Also provided according to the present invention is a method of fishing, comprising inserting the butt of a fishing rod into the shank of a rod holder according to the present invention, and then fishing with the fishing rod.

The present invention will be readily apparent to one of ordinary skill in the art from the following examples with reference to the Figures of the accompanying drawings, in which:

FIG. 3A is a cross-section through a perspective view of the assembled component parts of FIG. 1;

FIG. 3B is an enlarged view of part of FIG. 3A;

FIG. 5A is a perspective view of a ball member;

FIG. 5B is a perspective view of a ball member;

Figure 1:
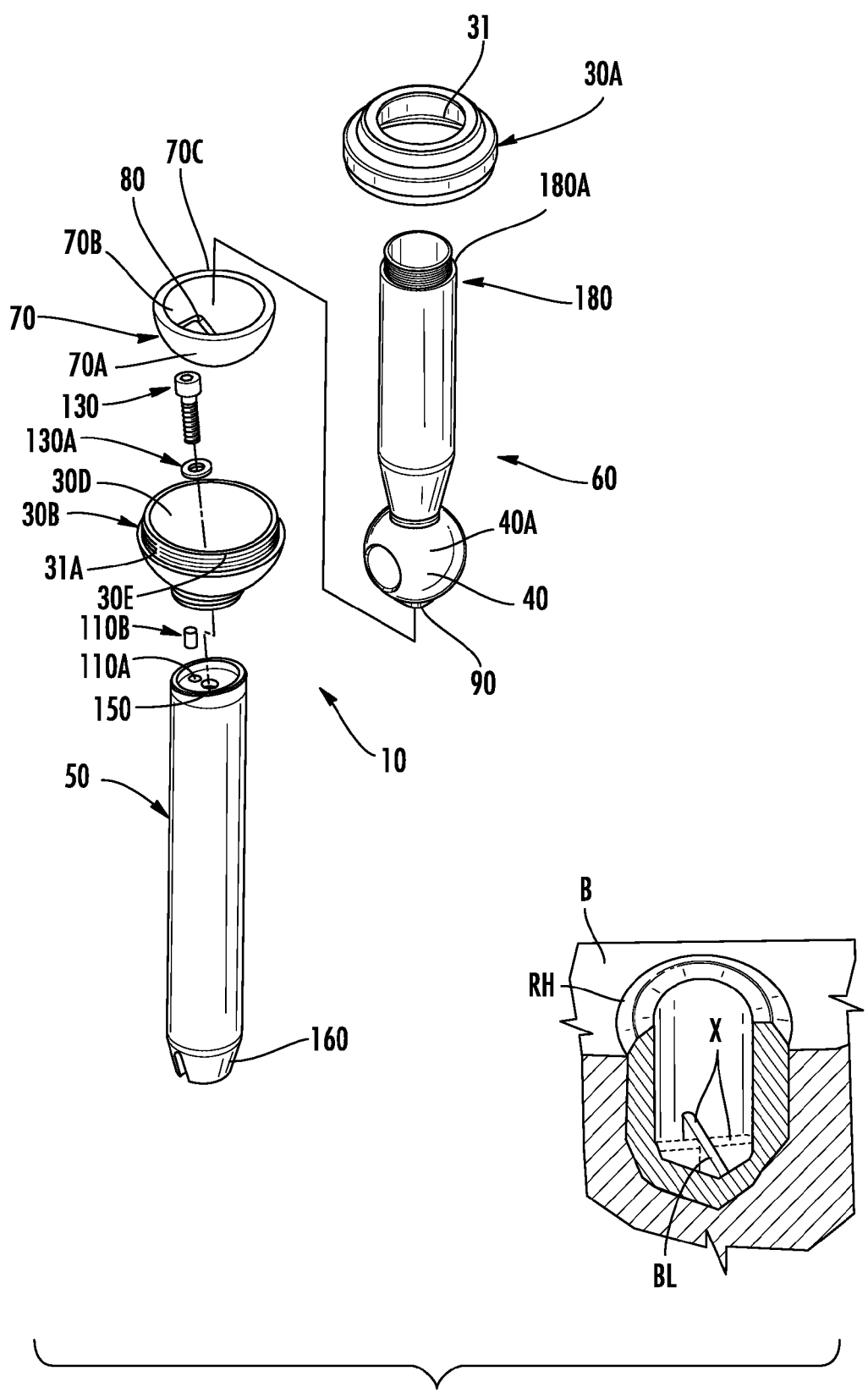
FIG. 1 is an exploded perspective view of the component parts of a rod holder according to the present subject matter and a cut-away portion of a boat in which the rod holder can be placed.
Figure 2A:
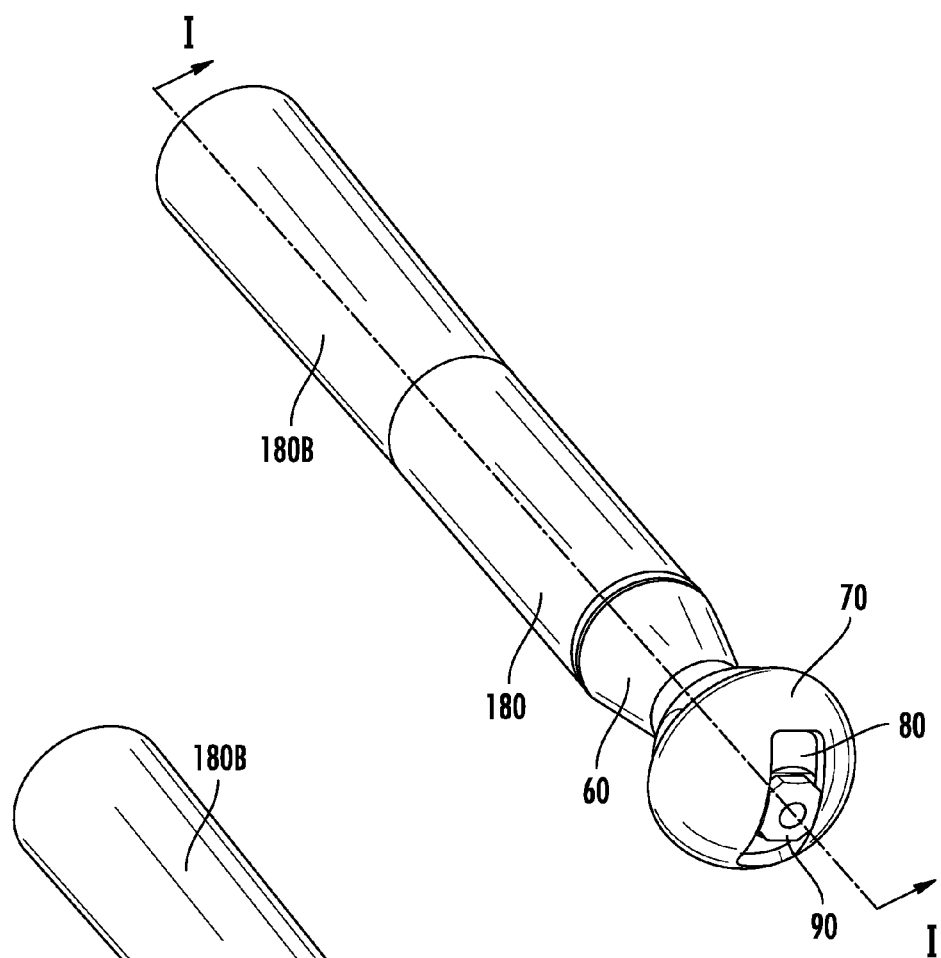
FIG. 2A is a perspective view of the ball member, shank and ball joint liner mated together.
Figure 2B:
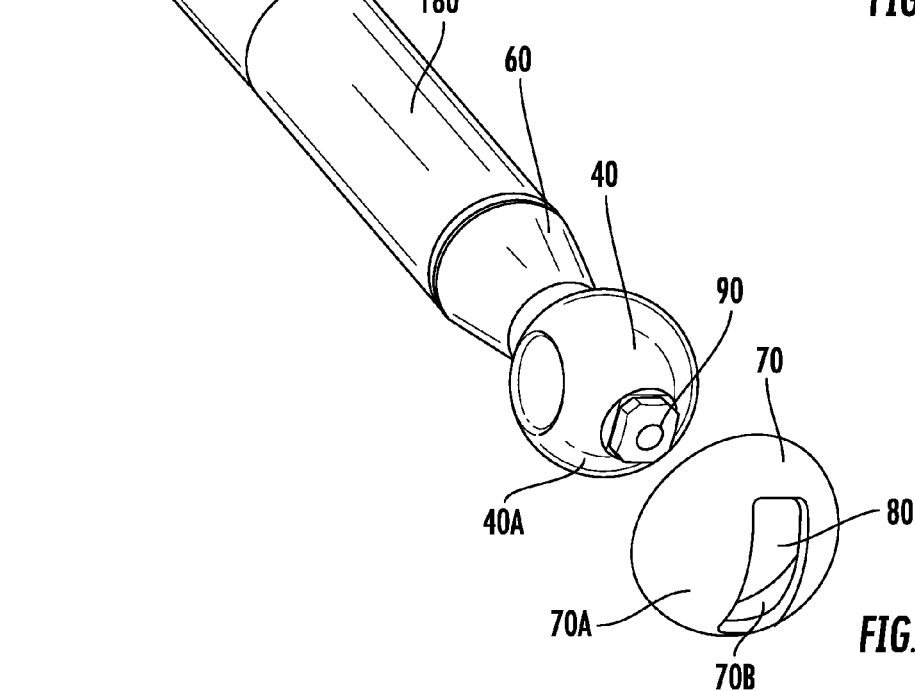
FIG. 2B is a perspective view of the ball member, shank and ball joint liner of FIG. 2A, separate from one another.

A list of reference signs used below is provided in the section immediately preceding the claims.

In a first embodiment, rod holder 10 comprises a ball joint arrangement 20 comprising:

a ball joint socket member 30;
  a ball member 40;
  a shaft 50 extending from ball joint socket member 30;
  a shank 60 extending from ball member 40 and adapted to receive a fishing rod butt (not shown); and
  a ball joint liner 70 located between ball joint socket member 30 and ball member 40, ball joint liner 70 defining a slot 80, ball member 40 having a finger 90 extending therefrom and mated with slot 80, finger 90 shaped such that it is able to slide along the length of slot 80 but is not able to rotate within slot 80.

Ball joint socket member 30 comprises an upper portion 30A and a lower portion 30B, which have complimentary threaded sections 31, 31A respectively which allow them to be screwed together.

Ball joint socket member 30 forms the static base portion of a two-axis gimbal.

Ball member 40 forms the driven upper portion of the two-axis gimbal.

The convex outer surface 40A of ball member 40 abuts the concave inner surface 70B of ball joint liner 70.

Figure 4A:
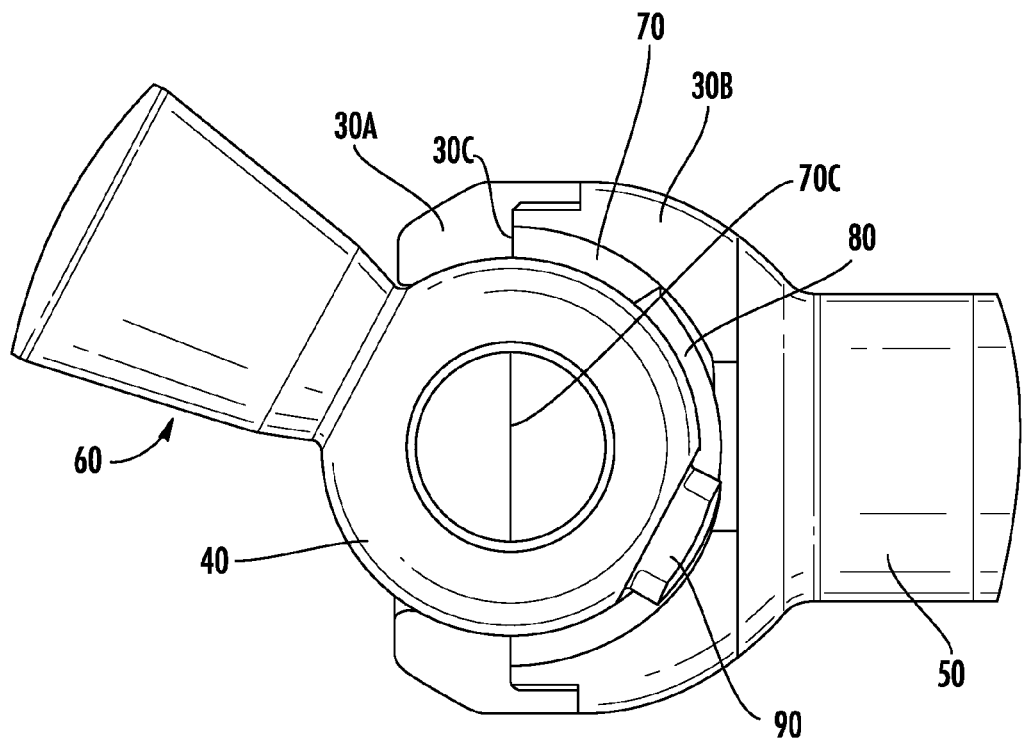
FIG. 4A is a section taken through a ball joint arrangement with the shank rotated in the ball joint liner slot to a first position.
Figure 4B:
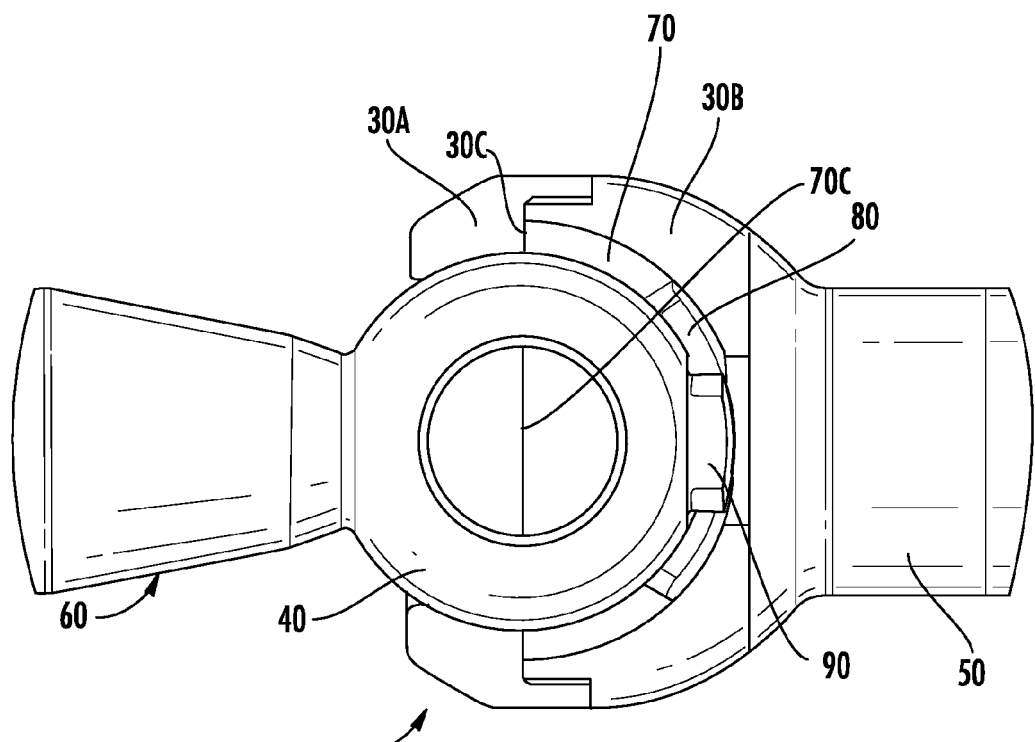
FIG. 4B is a section taken through a ball joint arrangement with the shank rotated in the ball joint liner slot to a second position.

With finger 90 mated with slot 80 of ball joint liner 70, finger 90 is unable to rotate within slot 80, meaning that ball member 40 is unable to freely rotate about ball joint liner 70. Instead, the only movement which ball member 40 is able to achieve relative to ball joint liner 70 is rotation about an axis generally perpendicular to a plane defined by slot 80. This is shown in FIGS. 4A and 4B.

The convex outer surface 70A of ball joint liner 70 abuts the concave inner surface 30D of ball joint socket member lower portion 30B.

Ball joint socket member upper portion 30A defines a shoulder portion 30C which extends radially inwards beyond upper surface 30E of lower portion 30B. Shoulder portion 30C abuts upper surface 70C of ball joint liner 70. As a result, shoulder portion 30C constrains the vertical movement of ball joint liner 70, meaning that ball joint liner 70 is free to rotate about a single axis within lower member 30B.

The use of a series of abutting convex and concave surfaces 40A and 70B, 70A and 30D is particularly advantageous since it allows for load imposed upon the two-axis gimbal (i.e. ball joint arrangement 20) to be conveniently spread across the abutting surfaces rather than at relatively small pivots. This can improve the reliability relative to that of conventional gimbals. Reliability, capacity to bear substantial loads, and tolerance to high load shocks is of particular importance since the most important fish (i.e. the heaviest, prize-winning, fish) will typically cause the greatest loads to be exerted upon the two-axis gimbal, and obviously reliability of the gimbal at such times is of great importance.

Therefore, the components of the ball joint arrangement 20 mean that ball member 40 cannot rotate freely about ball joint socket member 30. Instead, two discrete sets of movement are possible:

(i) Ball joint liner 70 is free to rotate within lower member 30B about a single axis, thus causing ball member 40 to rotate about that same axis. Thus, a "pan" motion can be achieved.
  (ii) Ball member 40 is additionally able to rotate about an axis generally perpendicular to a plane defined by slot 80. Thus, a forwards and backwards "tilt" motion is achieved.

The ball joint arrangement prevents a "yaw" movement being achieved.

Furthermore, the "tilt" movement of ball member 40 can additionally be constrained by shank 60 contacting the upper portion 30A of ball joint socket member 30.

Ball joint socket member 30 lower portion 30B defines a recess 110. Shaft 50 defines at its top a complimentary recess 110A, and a dowel 110B is inserted into one recess (110, 110A) and lower portion 30B and shaft 50 are brought together such that the dowel extends into both recesses 110, 110A to form a dowel joint 120, and thus ensure the correct orientation of lower portion 30B and shaft 50 relative to one another. The two parts are fixed together by the insertion of bolt 130 and washer 130A into and through recessed hole 140 in lower portion 30B, and is then screwed into threaded recess 150 of shaft 50. Naturally, this step of joining the lower section 30B to shaft 50 is done before liner 70 and ball member 40 are inserted into lower member 30B. Lower section 30B and shaft 50 are fabricated such that when screwed together, they are at an angle of 30 degrees to one another.

At the bottom of shaft 50 there is a butt gimbal 160 which is dimensioned to mate with a complimentary bar, blade, BL at the base of a gunwale rod holder RH in a boat B (as shown in FIG. 1) and thus prevent rotation of shank 50 in the gunwale rod holder RH. For example, shaft 50 can terminate in a mating portion, such as butt gimbal 160 adapted to mate with a blade BL or X-shaped section X (partially shown in dotted lines) which protrudes from the base of the rod holder RH defined in the boat B.

Figure 5C:
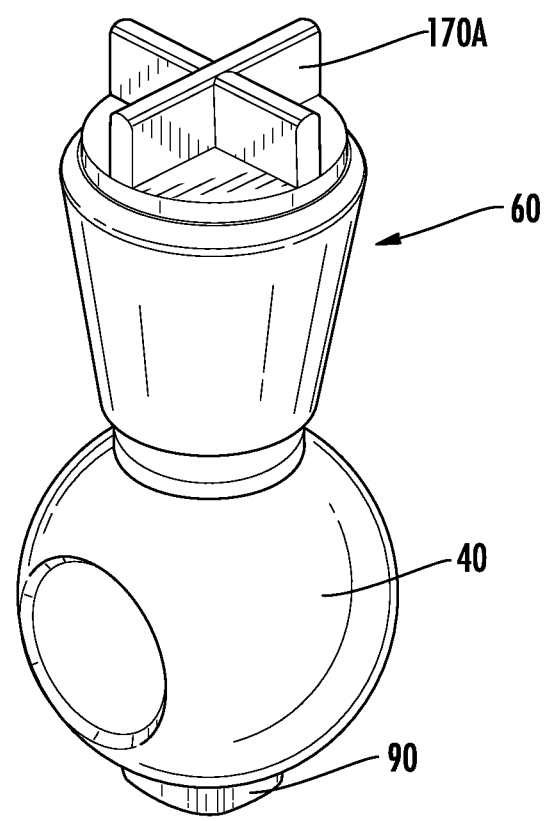
FIG. 5C is a perspective view of another embodiment of a ball member.
Figure 6:
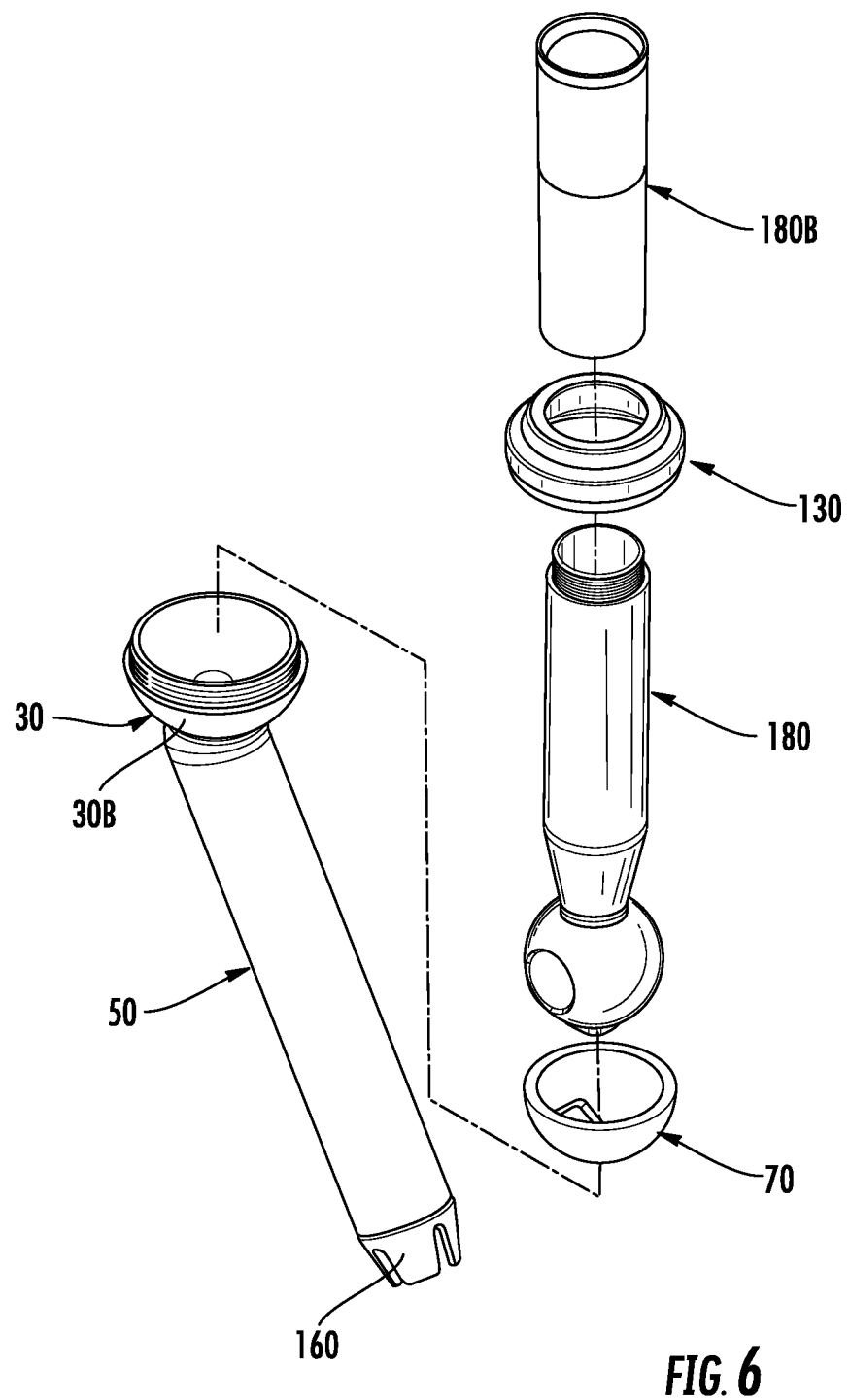
FIG. 6 is an exploded perspective view of the component parts of a rod holder.
Figure 7:
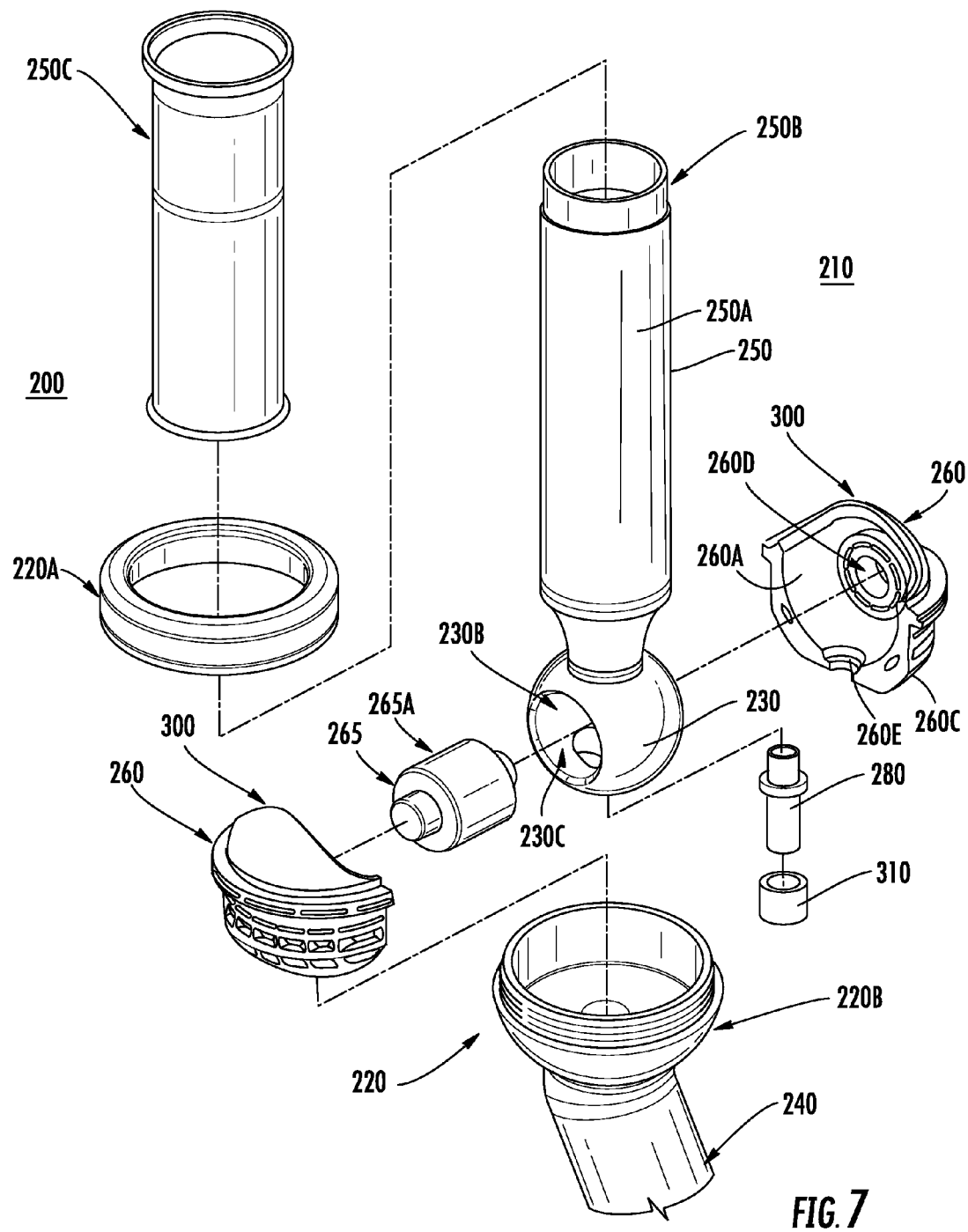
FIG. 7 is an exploded perspective view of the components parts of a second embodiment of a rod holder.
Figure 8:
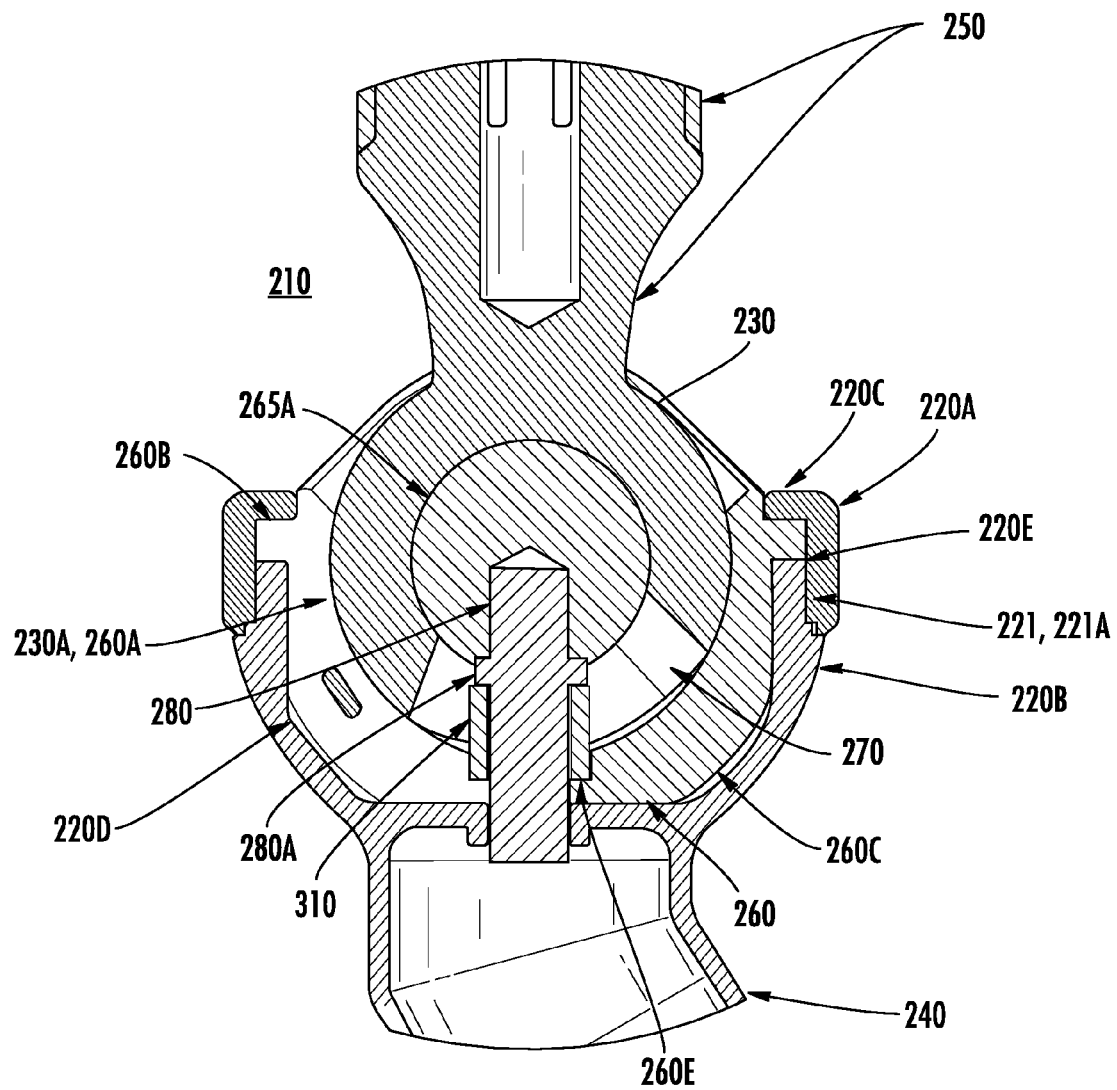
FIG. 8 is a section through the ball joint according to the second embodiment showing the assembled parts.
Figure 9:
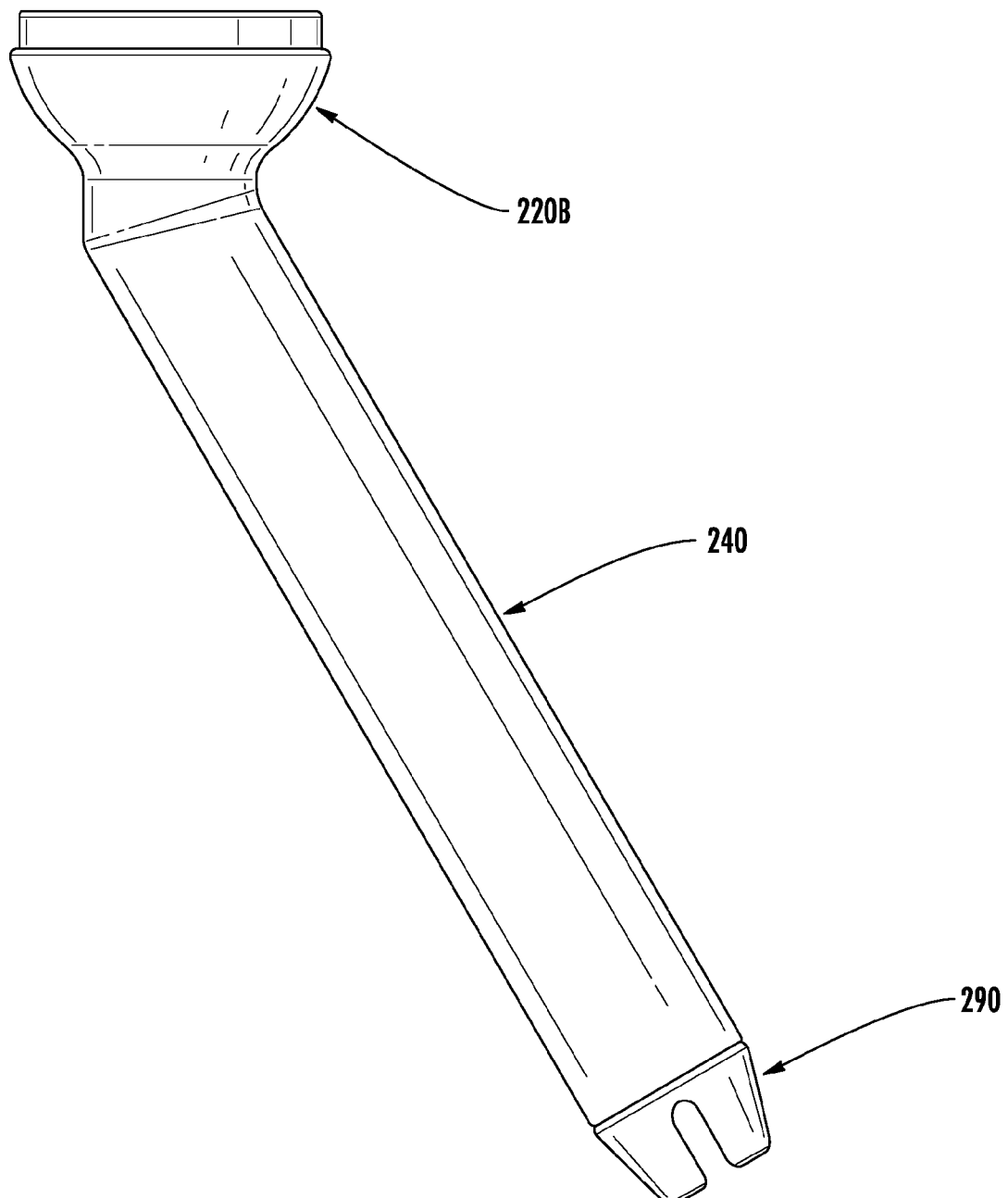
FIG. 9 is a view of the shaft member and ball joint socket member assembly according to the second embodiment of the invention.
Figure 10:
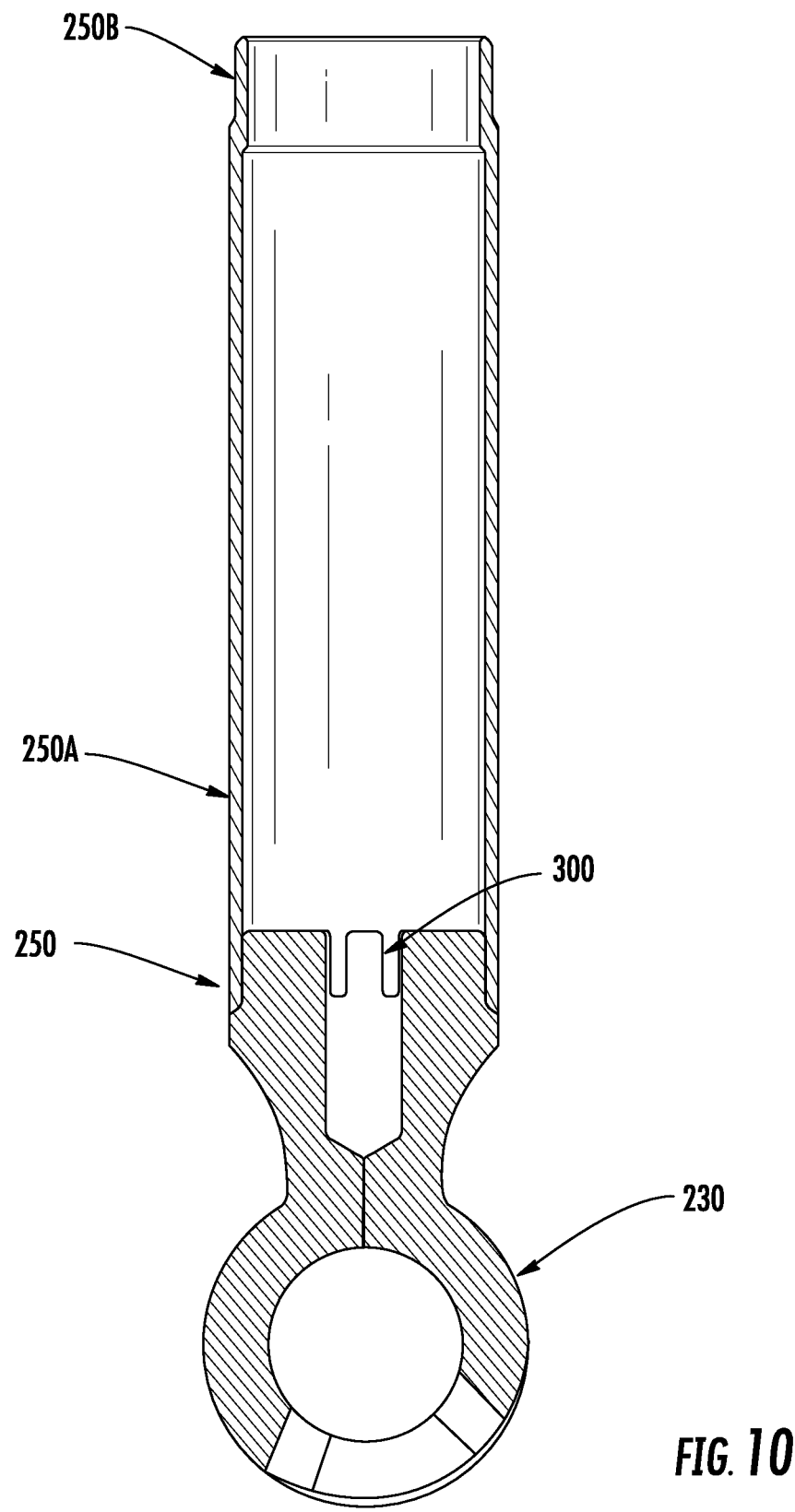
FIG. 10 is a section taken through the shank section of the second embodiment.

Ball member 40 has extending from it the first part of a shank 60 and terminates in a bar 170 on its upper surface as shown in FIG. 5A, which is dimensioned to mate with a fishing rod butt gimbal. In some embodiments as shown in FIG. 5C, the member 40 has extending from it the first part of a shank 60 and terminates in an X-shaped section 170A on its upper surface. Thus, a shank hollow ("flute") section can have defined within it a blade, or bar, 170 or X-shaped section 170A protruding from the base of the shank hollow ("flute") section for mating with a fishing rod butt gimbal. Shank first hollow section 180 is secured (for example by welding or with epoxy resin) to ball member 40. Shank first hollow section 180 terminates in a threaded section 180A, onto which is screwed the complimentary threaded section (not shown) of shank extension 180B. The portion extending from ball member 40, shank first hollow section 180 and shank extension 180B together define shank 60.

Different length shank extensions 180B can be used in order to define a suitable length of shank 60 hollow section which a fishing rod (not shown) is then inserted into.

In certain embodiments (not shown) the angle of shaft 50 to lower portion 30B of ball joint socket member 30 is adjustable. In certain embodiments, shaft 50 defines a first fixed angle to lower portion 30B, and is replaced with an alternative shaft 50 defining a second fixed angle to lower portion 30B. In certain embodiments, a pair of opposed wedges are provided between shaft 50 and lower portion 30B, the wedges being rotatable relative to one another between indexed positions to allow shaft 50 and lower portion 30B to be set at a desired angle relative to one another.

In other embodiments (not shown) a lip/recess is defined in upper portion 30A of ball joint socket member 30, allowing shank 60 and any rod contained therein to be pulled further back. Naturally, slot 80 must be dimensioned to allow for such movement.

In use, rod holder 10 is placed in a gunwale rod holder (not shown), with butt gimbal 160 mated with a complimentary bar (not shown) in the gunwale rod holder. The butt of a fishing rod (not shown) is then inserted into shank hollow section 180 and fishing is commenced.

In a second embodiment, rod holder 200 comprises a ball joint arrangement 210 comprising:
- a ball joint socket member 220;
- a ball member 230;
- a shaft 240 extending from ball joint socket member 220;
- a shank 250 extending from ball member 230 and adapted to receive a fishing rod butt (not shown); and
- a ball joint liner 260 located between ball joint socket member 220 and ball member 230, the ball member 230 defining a slot 270, ball joint liner 260 having a finger 280 extending therefrom and mated with the slot 270, the finger 280 shaped such that it is able to slide along the length of the slot 270

Ball joint socket member 220 comprises a separable retaining portion 220A and a base portion 220B, which have complimentary threaded sections 221, 221A respectively which allow them to be screwed together.

Ball joint socket member 220 forms the static base portion of a two-axis gimbal.

Ball member 230 forms the driven upper portion of the two-axis gimbal.

The convex outer surface 230A of ball member 230 abuts the concave inner surface 260A of ball joint liner 260.

A portion of the outer surface 260C of ball joint liner 260 abuts the inner surface 220D of ball joint socket member base (lower) portion 220B.

Ball joint socket member separable retaining (upper) upper portion 220A defines a shoulder portion 220C which extends radially inwards beyond upper surface 220E of base portion 220B. Shoulder portion 220C abuts upper surface 260B of ball joint liner 260. As a result, shoulder portion 220C constrains the vertical movement of ball joint liner 260, meaning that ball joint liner 260 is free to rotate about a single axis within base portion 220B.

Within the ball joint arrangement 210 a cylindrical cross member 265 having first and second ends is located, extending through (and protruding from) ball member passage 230C defined in the ball member 230, and is mated at each end with a recess 260D in the ball joint liner 260. The convex outer surface 265A of the cross member 265 abuts the concave inner surface 230B of the ball member 230, the contact being a sliding contact.

The use of a series of abutting surfaces 230A and 260A, 260C and 220D, 265A and 230B combined with the cross member 265 mated with the ball joint liner 260 is particularly advantageous since it allows for load imposed upon the two-axis gimbal (i.e. ball joint arrangement 210) to be conveniently spread across the abutting surfaces rather than being concentrated at relatively small pivots. This can improve the reliability relative to that of conventional gimbals. Reliability, capacity to bear substantial loads, and tolerance to high load shocks is of particular importance since the most important fish (i.e. the heaviest, prize-winning, fish) will typically cause the greatest loads to be exerted upon the two-axis gimbal, and obviously reliability of the gimbal at such times is of great importance.

Finger 280 extends from ball joint liner 260 through slot 270 in ball member 230, and mates with cross member 265. This prevents cross member from rotating about its longitudinal axis. As shank 250 tilts, ball member 230 rotates about the longitudinal axis of cross member 265, and so ball member concave inner surface 230B and cross member outer surface 265A slide past each other.

Therefore, the components of the ball joint arrangement 210 mean that ball member 230 cannot rotate freely about ball joint socket member 220. Instead, two discrete sets of movement are possible:
  (i) Ball member 230 is able to rotate about a first axis generally perpendicular to a plane defined by slot 220. Thus, a forwards and backwards "pitch" motion is achieved.
  (ii) Ball joint liner 260 is free to rotate within base portion 220B about a second axis, thus causing ball member 230 to rotate about that same axis. Thus, a "pan"/"yaw" motion can be achieved.

The ball joint arrangement prevents a "roll" movement being achieved as the finger 280 abuts the side of the slot 270.

Furthermore, the "pitch" movement of ball member 230 is additionally constrained by shank 250 abutting the end of upper slot 300 defined in ball joint liner 260.

finger 280 is located within cross member 265, ball member 230, ball joint liner 260, and ball joint socket member 220. It is mated with a recess/orifice defined by each component except in the ball member 230 where it extends through slot 270. To aid in locating finger 280 within ball joint arrangement 210 and for transferring load through the components, finger 280 sits within a separable washer 310 which in turn is located within a recess 260E in ball joint liner 260, concentric with that for finger 280. Finger 280 comprises a shoulder 280A which abuts and rests on separable washer 310 which, together with cross member 265, prevents longitudinal movement of finger 280.

At the bottom of shaft 240 there is a butt gimbal 290 which is dimensioned to mate with a complimentary bar at the base of a gunwale rod holder (not shown) and thus prevent rotation of shank 240 in the gunwale rod holder (not shown).

Ball member 230 has extending from it the first part of a shank 250 and terminates in an extended cross 300 on its upper surface, which is dimensioned to mate with a fishing rod butt gimbal. Shank first hollow section 250A is secured (for example by welding or with epoxy resin) to the shank portion of ball member 230. Shank first hollow section 250A terminates in a threaded section 250B, onto which is screwed the complimentary threaded section (not shown) of shank extension 250C. The shank portion extending from ball member 230, shank first hollow section 250A and shank extension 250C together define shank 250.

Different length shank extensions 250C can be used in order to define a suitable length of shank 250 hollow section which a fishing rod (not shown) is then inserted into.

In use, rod holder 200 is placed in a gunwale rod holder (not shown), with butt gimbal 290 mated with a complimentary bar (not shown) in the gunwale rod holder. The butt of a fishing rod (not shown) is then inserted into shank hollow section 250A and fishing is commenced.

As detailed above, in other embodiments (not shown), the axes about which the ball joint liner and ball member are able to rotate are switched. Thus, the ball joint liner and ball member are arranged such that the ball member is able to rotate about a first axis in a yawing movement, and the ball joint liner is able to rotate about a second axis in a pitching movement. Naturally, the mechanical arrangement of the rod holder and its component parts is modified accordingly.

It will be appreciated that it is not intended to limit the present invention to the above specific embodiment only. Many variants will be readily apparent to one of ordinary skill in the art without departing from the scope of the appended claims.

REFERENCE SIGNS

10—rod holder
20—ball joint arrangement
30—ball joint socket member
30A—upper portion (ball joint socket member)
30B—lower portion (ball joint socket member)
30C—shoulder portion
30D—concave inner surface (of ball joint socket member lower portion)
30E—upper surface
31—threaded section
31A—threaded section
40—ball member
40A—convex outer surface
50—shaft
60—shank
70—ball joint liner
70A—convex outer surface (ball joint liner 70)
70B—concave inner surface (ball joint liner 70)
70C—upper surface (ball joint liner 70)
80—slot
90—finger
110—recess (ball joint socket member lower portion 30B)
110A—recess (shaft)
110B—dowel
120—dowel joint
130—bolt
130A—washer
140—recessed hole
150—threaded recess
160—butt gimbal
170—bar (ball member 40)
180—shank first hollow section
180A—threaded section (shank first hollow section 180)
180B—shank extension
200—rod holder
210—ball joint arrangement
220—ball joint socket member
220A—separable retaining portion
220B—base portion
220C—shoulder portion
220D—inner surface
220E—base portion upper surface
221—threaded section
221A—threaded section
230—ball member
230A—convex outer surface
230B—concave inner surface
230C—ball member passage
240—shaft
250—shank
250A—first hollow section
250B—threaded section
250C—shank extension
260—ball joint liner
260A—concave inner surface
260B—upper surface
260C—outer surface
260D—recess
260E—recess
265—cross member
265A—outer surface
270—slot
280—finger
280A—shoulder
290—butt gimbal
300—upper slot
310—separable washer

The invention claimed is:

1. A rod holder comprising:
a two-axis gimbal comprising:
a static base portion; and
a driven upper portion;
a shaft extending from said static base portion; and
a shank extending from said driven upper portion and adapted to receive a fishing rod butt,
said driven upper portion configured to be at least partially rotatable about a first axis that passes through said static base portion and at least partially rotatable about a second axis that also passes through said static base portion during use while said rod holder is holding a fishing rod such that the driven upper portion is constrained just to rotation about the first axis and the second axis, said first and second axes being substantially perpendicular to each other
where the two-axis gimbal comprises a ball joint arrangement with:
said static portion comprising a ball joint socket member;
said driven upper portion comprising a ball member;
said shaft extending from said ball joint socket member;
said shank extending from said ball member and adapted to receive a fishing rod butt; and
a ball joint liner located between said ball joint socket member and said ball member,
said ball member defining a slot, said ball joint liner having a finger extending therefrom and mated with and residing in said slot, said finger shaped such that it is able to slide along the length of said slot but is not able to rotate within said slot to provide at least a partially rotational movement about said first axis;
said ball joint socket member defining a shoulder portion which constrains movement of said ball joint liner to provide at least a partially rotational movement about said second axis.

2. A rod holder comprising:
a two-axis gimbal comprising:
a static base portion; and
a driven upper portion;
a shaft extending from said static base portion; and
a shank extending from said driven upper portion and adapted to receive a fishing rod butt,
said driven upper portion configured to be at least partially rotatable about a first axis that passes through said static base portion and at least partially rotatable about a second axis that also passes through said static base portion during use while said rod holder is holding a fishing rod, said first and second axes being substantially perpendicular to each other;
wherein the two-axis gimbal comprises a ball joint arrangement with:

said static portion comprising a ball joint socket member;

said driven upper portion comprising a ball member;

said shaft extending from said ball joint socket member;

said shank extending from said ball member and adapted to receive a fishing rod butt; and a ball joint liner located between said ball joint socket member and said ball member, a first component comprising one of said ball joint liner and said ball member defining a slot, a second component comprising the other of said ball joint liner and said ball member having a finger extending therefrom or therethrough and mated with and residing in said slot, said finger shaped such that it is able to slide along the length of said slot to provide at least a partially rotational movement about said first axis;

said ball joint socket member comprising a retaining portion which retains said ball joint liner and/or said ball member in said ball joint socket member and constrains movement of said ball joint liner to provide at least a partially rotational movement about said second axis.

3. A rod holder according to claim 2, wherein said ball member and said ball joint liner adapted such that said ball member is rotatable relative to said ball joint liner about said first axis.

4. A rod holder according to claim 3, wherein said ball joint liner defining a ball joint liner cavity within which said ball member is located, a ball member passage being defined within and traversing said ball member, said rod holder additionally comprising a cross member traversing said ball joint liner cavity via said ball member passage from a first part of said ball joint liner to a second part of said ball joint liner, said ball member being rotatable about an axis defined by said cross member.

5. A rod holder according to claim 4, wherein said cross member is separable from said ball joint liner, and wherein said finger is mated with said cross member.

6. A rod holder according to claim 2, wherein said finger is shaped such that it is able to slide along the length of said slot but is not able to rotate within said slot.

7. A rod holder according to claim 2, wherein said ball member and said shank combined define a ball and shank member, wherein at least one of said ball joint liner and said ball joint socket member defines an upper slot through which said ball and shank member extends, said upper slot constraining movement of said ball and shank member.

8. A rod holder according to claim 7, wherein the part of said ball and shank member located within said upper slot, is able to slide along the length of said upper slot.

9. A rod holder according to claim 2, wherein said ball joint socket member comprises said base portion and said retaining portion, said retaining portion being separable from said base portion, and said ball joint socket retaining portion abuts said ball joint liner.

10. A rod holder according to claim 2, wherein said finger is separable and detachable from the component part from which it extends.

11. A rod holder according to claim 10, wherein said finger is screwably separable from the component part from which it extends.

12. A rod holder according to claim 11, wherein said finger is slidably separable from the component part from which it extends.

13. A rod holder according to claim 4, wherein said finger extends between said first and second components and at least one of said ball joint socket member and said cross member.

14. A rod holder according to claim 13, wherein said finger comprises a shoulder or other location aiding feature, said shoulder or other location aiding feature abutting with a washer and locating said finger within a recess in said ball joint arrangement, and wherein said washer is wholly or partially located within at least one of said ball joint liner, said ball joint socket member and said ball member.

15. A rod holder according to claim 2, wherein said ball joint liner is fabricated in at least two separate sections.

16. A rod holder according to claim 2, wherein said shank terminates in a hollow flute section, and said hollow flute section is elongate and is adapted to mate with a fishing rod butt gimbal, wherein said hollow flute section has defined within it a blade or X-shaped section protruding from the base of the flute section for mating with a fishing rod butt gimbal.

17. A rod holder according to claim 2, wherein said shaft terminates in a mating portion adapted to mate with a blade or X-shaped section which protrudes from the base of a rod holder defined in a boat.

18. A rod holder comprising:

a two-axis gimbal comprising:

a static base portion; and a driven upper portion;

a shaft extending from said static base portion; and a shank extending from said driven upper portion and adapted to receive a fishing rod butt, said driven upper portion configured to be at least partially rotatable about a first axis that passes through said static base portion and at least partially rotatable about a second axis that also passes through said static base portion during use while said rod holder is holding a fishing rod, said first and second axes being substantially perpendicular to each other;

wherein the two-axis gimbal comprises a ball joint arrangement with:

said static portion comprising a ball joint socket member;

said driven upper portion comprising a ball member;

said shaft extending from said ball joint socket member;

said shank extending from said ball member and adapted to receive a fishing rod butt; and a ball joint liner located between said ball joint socket member and said ball member, said ball joint liner defining a slot, said ball member having a finger extending therefrom and mated with and residing in said slot, said finger shaped such that it is able to slide along the length of said slot but is not able to rotate within said slot to provide at least a partially rotational movement about said first axis;

said ball joint socket member defining a shoulder portion which constrains movement of said ball joint liner to provide at least a partially rotational movement about said second axis.

* * * * *